April 25, 1950     R. C. GILBERT ET AL     2,505,614

BATTERY CHARGER

Filed Aug. 19, 1949     3 Sheets-Sheet 1

INVENTORS
RUSSELL C. GILBERT
LESTER L. WILBRECHT
BY Paul, Paul & Moore
ATTORNEYS April 25, 1950
R. C. GILBERT ET AL
2,505,614
BATTERY CHARGER
Filed Aug. 19, 1949
3 Sheets-Sheet 2
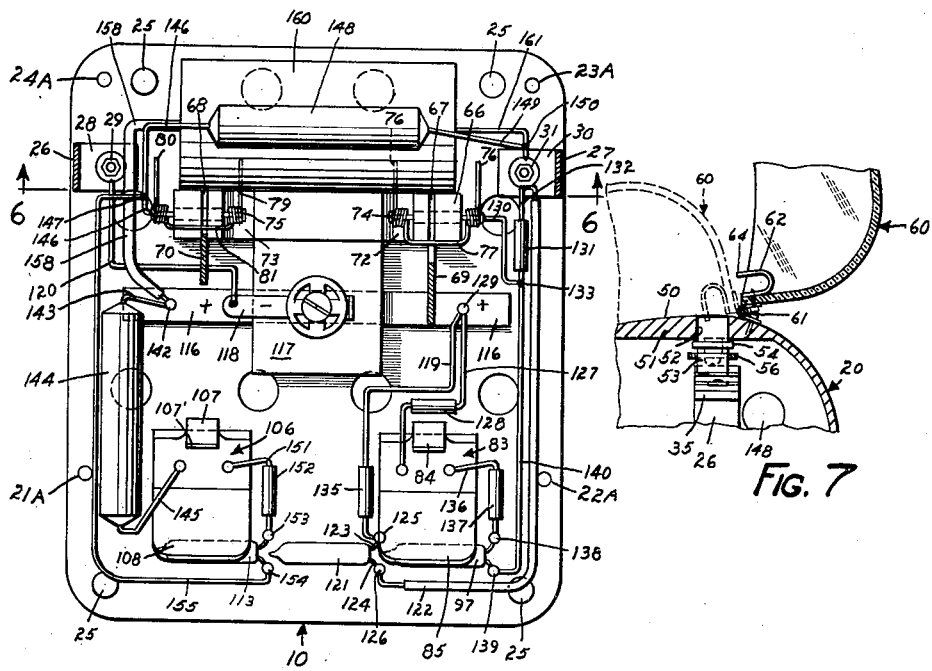
Fig. 5
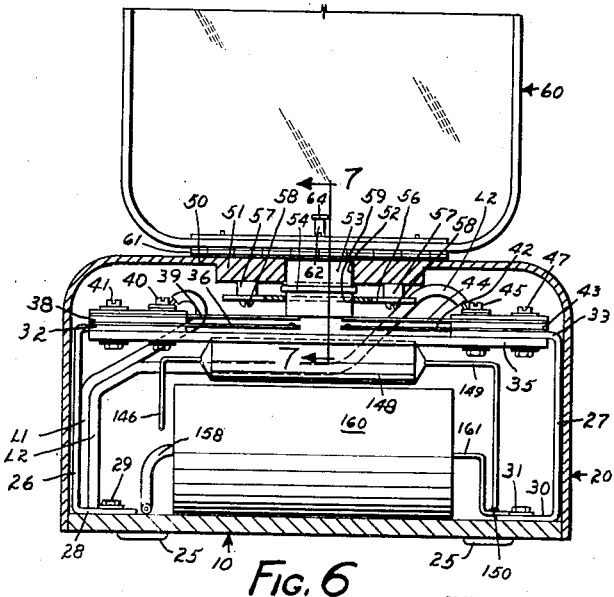
Fig. 7
Fig. 6
INVENTORS
RUSSELL C. GILBERT
LESTER L. WILBRECHT
BY Paul, Paul & Moore
ATTORNEYS INVENTORS
RUSSELL C. GILBERT
LESTER L. WILBRECHT
BY Paul, Paul & Moore
ATTORNEYS Patented Apr. 25, 1950

2,505,614

UNITED STATES PATENT OFFICE 2,505,614

BATTERY CHARGER

Russell C. Gilbert, Stillwater, and Lester L. Wilbrecht, St. Paul, Minn., assignors to Telex Inc., Minneapolis, Minn., a corporation of Minnesota Application August 19, 1949, Serial No. 111,304

12 Claims. (Cl. 320—4)

This invention relates to battery chargers and particularly to a battery charger which may be used by inexperienced persons for what is known as the re-charging of hearing aid A and B cells. While, strictly speaking, it is not possible to "recharge" primary cells, this term has come into common use for the process of renovating hearing aid cells, which might more properly be called electrical depolarization. Since the term "recharge" is in common use, it will be used herein.

The A cell and B battery of hearing aids are relatively small in size, and since the hearing aids are worn continuously or almost continuously the drain on these cells is relatively heavy. In years past it has been customary merely to replenish the cells and to discard the old and discharged cells, but more lately it has been found possible to recharge the cells and to obtain greatly increased life for them by virtue of such recharging operation. Hearing aids are worn for the most part by persons of little experience in electrical matters and by older persons, and accordingly any battery charging device suitable for their use must be of the utmost simplicity.

It is an object of the present invention to provide a combined A cell and B battery charging device for hearing aid recharging service of utmost simplicity and capable of being used by inexperienced and elderly persons without harm to the cell or danger to the user.

It is a further object of the invention to provide a hearing aid battery recharging device which is completely safe to use and which does not present any live terminals to the user when in loading condition.

It is a further object of the invention to provide an improved A cell and B battery charging device with indicators so as to show when the device is in operation.

Other and further objects of the invention are those inherent in the apparatus herein illustrated, described and claimed.

The invention is illustrated with reference to the drawings in which corresponding numerals refer to the same parts and in which Figure 1 is a plan view of the device with the cover lifted;

Figure 5 is a plan view of the apparatus showing the case removed so as to expose the working elements of the device and taken along a section line, as at 5—5 of Figure 3, with the battery removed;

Figure 6 is a sectional view taken in the direction of arrows 6—6 of Figure 5;

Figure 7 is a sectional view through the hinge-switch mechanism of the device, taken in the direction of arrows 7—7 of Figure 6;

Figure 1:
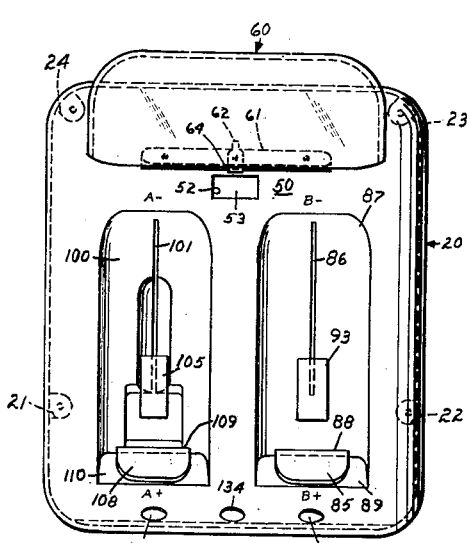

Referring to the drawings, the battery charger of the instant invention includes a base member 10, preferably of plastic sheet, and a molded cover 20 which fits down around the base when the cover is applied to the base. The cover is provided with interior molded bosses 21, 22, 23 and 24 through which screws are inserted through holes 21A, 22A, 23A and 24A in the bottom so as to hold the molded cover to the base. In the base 10 there are four inserts 25 of rubber which serve as feet upon which the base 10 rests when the unit is set down.

At the rear of the base are two posts 26 and 27, each of which serves as a mechanical support and electrical connection. It will be noted that the post 26 is bent over at its bottom 28 and is attached to the base by means of a small bolt 29, the post 27 being similarly bent over at the base portion 30 and attached by a small bolt 31. The upper end of each post is likewise bent over, as shown at 32 for post 26 and 33 for post 27. The bent over portions 32 and 33 are attached together by an insulating strip 35 and the bent over portions 32 and 33 each serve to support a pair of switch blades. Thus, there is provided a switch blade 36 which rests directly upon the bent over portion 32 of post 26. Above the switch blade 36 is a strip of insulation 38 and above it a second switch blade 39. A through-bolt and electrical connection is provided at 40 which serves as a terminal for the upper switch blade 39. The bolt 40 is otherwise insulated throughout its length from the switch blade 36. Another bolt 41 is insulated from the lower switch blade 36 and portion 32 of the post. On the post 27 there is a similar arrangement of switch blade, the lower blade 42 resting directly upon the bent over upper portion 33 of the post. Upon the switch blade 42 there is a strip of insulation 43 and upon it rests the upper switch blade 44. The switch blades and insulation in assembled relation are held by a pair of bolts 45 and 47 which serve not only as a fastening, but also as an electrical terminal for the upper switch blade 44, the bolt 45 being otherwise insulated from the lower switch blade 42 and the portion 43 of the post. Another bolt 47 is passed through the assembly and is likewise insulated from the lower switch blade 42 and portion 33 of the post. The incoming electrical circuit indicated by the double wire cord $L_1$—$L_2$ enters the unit through a grommet 48 at the rear portion 49 of the cover 20 and one of the incoming power lines $L_1$ is connected to the bolt-terminal 40, whereas the other $L_2$ is connected to the bolt-terminal 45. The pair of switch blades 36 and 39 are normally spaced from each other, as are blades 42 and 44. Each pair, viz. 36 and 39 and also 42 and 44, are pushed together by member 53 as now described.

The upper portion 50 of the case is provided with a flat boss area 51 extending downwardly from its highest part. This boss 51 is provided with a rectangular slot 52 and in the slot there slides vertically a plastic button 53 which has a mid-flange at 54. Below the flange 54 there is a plate 56 which is held in spaced relation to the bottom of the boss 51 by a pair of collars 57 and screws 58 which enter the lower surface of the boss from the inside of the unit. The plate 56 has a rectangular opening 59 centrally therethrough so as to be aligned with the rectangular opening 52 and accordingly the slide member 53, which is also of rectangular cross section, is permitted to move up and down, the upper limit of movement being defined by engagement of the flange 54 with the under surface of the boss 51 and the lower limit of movement by the engagement of the flange 54 for the upper surface of the plate 56. The rectangular block 54 is of sufficient cross dimension so that it engages and rests upon the upper surfaces of each of the switch blades 39 and 44 and is adapted to press them down simultaneously. When the slide 53 is depressed, by the action of cover member 60 which will be described, the switch blades 39 and 44 are pressed downwardly, thus causing each of them to establish contact with its cooperating switch blade 36 and 42, respectively. The rectangular slide 53 has a sufficiently loose fit so that no binding occurs. When the slide 53 is not pressed down, the springiness of the switch blades 39 and 44 causes the slide 53 to be lifted and the contacts to be broken.

The cover member 60 is preferably of clear plastic sheet pressed to the shape shown in the drawings, so as to cover the working parts of the battery charger and the batteries when they are in place being charged, and yet permit the user to see the batteries in place. The cover is hinged to the case at 61 and on the inside of the hinge there is provided a bent down U-shaped hook piece 62 so arranged that when the cover is in the closed position, as shown in Figures 3 and 4 and in dotted lines in Figure 7, the tip 64 of the hook will move into engagement with and will press down upon the upper surface of the vertical rectangular slide 53 and cause it to be pushed downwardly to switch closing position. Yet when the cover is elevated to the position shown in Figures 1, 2 and 6, and in full lines in Figure 7, the tip 64 is retracted off the surface of the slide 53 and the inherent springiness of the switch contacts 39 and 44 causes the slide to be lifted and the contacts separated, as previously described. Hence, by merely lifting the cover the main switches 36—39 and 42—44 of the unit are permitted to open, thus opening all circuits to the battery charging mechanism. Yet when the cover, which is of clear plastic, is moved to the closed position, as shown in dotted lines in Figure 7, the circuits are re-established and the battery charging operation ensues.

Upon the rear central portion of the base 10 there is mounted an insulating block 66 having slots 67 and 68 milled in it to receive a pair of battery contacting and switching blades 69 and 70, respectively. The block 66 also has some wider slots 72 and 73 therein. The blade 69 is held by a pivot pin 74 which also serves as a contact, and the blade 70 is held by a pivot pin 75 which likewise serves as a contact. Around the pin 74 is wrapped a spiral spring having tip portion 76—76 which bears upon the upper surface of the base, and a central U-portion 77 which reaches across the upper portion of the blade 69, causing it normally to be pushed downwardly. The blade 69 can, however, be lifted manually against the pressure of the spring 77 for switching and battery inserting operations preparatory to charging. Similarly, a spring member 79—80—81 rests upon and presses downwardly on the switch blade 70 causing it likewise normally to be moved in the downward position. Yet blade 70 can be lifted up manually for inserting the battery and for switching arrangements.

Each of the blades 69 and 70 has, in cooperation therewith, a rest-battery contact strip which is mounted upon the base and extends through the cover 20 as follows: The rest-contact strip for cooperating with the blade 69 is indicated generally at 83 and has a rear upturned portion 84 of comparatively narrow width, and a front broad upwardly slanting portion 85. The portion 84 is of such a height that it comes up close to the slot 86 in the battery recess 87 for the B battery so as to be engaged by strip 69 when nothing is in recess 87, and the upwardly slanting portion 85 is of such a width and slant that it comes up through the slot 88 in the base of the recess 87 and rests against the portion 89 of the battery recess where it forms the B+ contact for B batteries placed in the recess 87 for charging. It will be noted that the blade 69 has a rounded tip portion 90 that is slotted at 91 so as to leave a finger 92 upon which an insulating plastic grip 93 can be attached. The blade 69, which is in battery charging position in Figure 4, extends thus outwardly through the slot 86 and the portion 90 contacts with the negative terminal B— of the B battery indicated B, whereas the slanting portion 85 of the contact and switch post generally designated 83 serves as a rest against which the B battery slides and makes contact and constitutes the B+ terminal. The spring 77—78 always exerts a rotating force in the direction of arrow 95, thus maintaining the contacts previously described. When the B battery is removed from the recess 87, the spring 77 causes the blade 69 to move down to the dotted line position, as shown in Figure 4, thus causing it to engage upon the upper edge 84' of the contact and terminal arrangement 83, accordingly establishing a contact from the blade 69 to the terminal 83.

Immediately below and in front of the portion 88 of the case there is a space 96 in which a small gas-filled glow-type lamp 97 is positioned. The lamp 97 is an indicator lamp and through the adjacent portion 98 of the case there is inserted a clear plastic rod-button, such as Lucite rod-button 99, which reaches from a position closely adjacent the lamp 97 through the case. When the lamp 97 is illuminated enough light passes outwardly through the Lucite rod-button 99 so as to make the illumination of the lamp visible from the front of the case for indication purposes.

Figure 2:
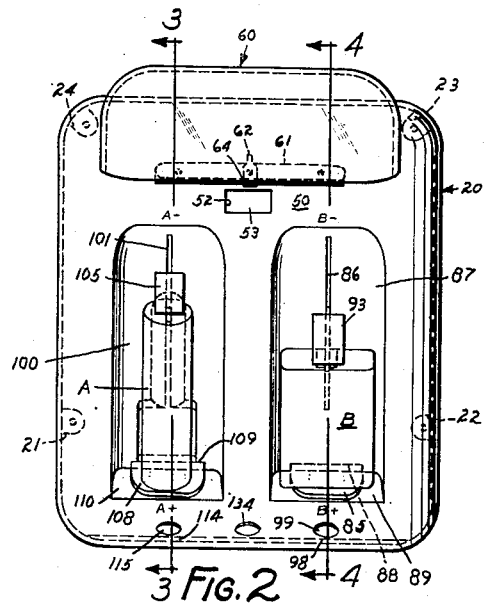
Figure 2 is a top view of the device with the cover lifted and with A and B cells both in place for charging.
Figure 3:
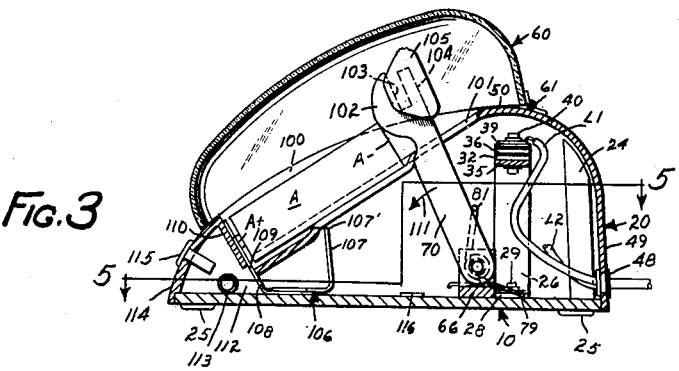
Figure 3 is a sectional view along the line and in the direction of arrows 3—3 of Figure 2 showing an A cell in charging position and the cover closed.
Figure 4:
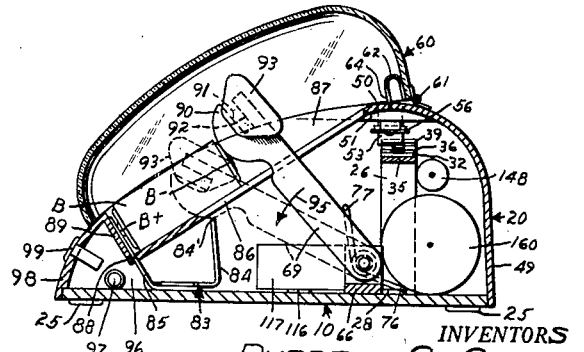
Figure 4 is a sectional view along the line and in the direction of arrows 4—4 of Figure 2 showing a B battery in charging position and the cover closed.

Similarly, referring to Figures 1, 2 and 3, a recess 100 is provided for the A cell charging, the recess 100 having a slot 101 through which the switch blade 70 extends, the blade terminating in a rounded tip 102 having a slot at 103 and leaving finger 104 upon which the plastic insulating grip 105 is attached. Likewise, beneath the recess 100 is a terminal switch and contact arrangement generally designated 106 having an up-turned relatively narrow inner portion 107 terminating at 107' adjacent the lower end of the slot 101 and an upwardly slanting portion 108 which extends out through the slot 109 and rests against the flat inclined portion 110 of the base of recess 100, forming a terminal against which the positive terminal A+ of the A cell, designated A, is adapted to be rested, and with which it establishes contact. The rounded portion 102 of the blade 70 contacts against the opposite end of the A cell which is the A— terminal. The spring 81 likewise normally causes the blade 70 to be pressed in the direction of arrow 111 and when the A cell is removed, the blade 70 moves counterclockwise in the slot 101, as shown in Figure 3, and the blade 70 establishes contact with the portion 107 of the contact and terminal arrangement 106. Likewise, within the space 112 immediately below the slanted portion 110 of the A cell recess, there is positioned an indicator light 113 of the glow type and through the adjacent portions 114 of the case there is inserted a Lucite rod-button 115 which conveys light from the lamp 113 to the exterior of the case for indication purposes.

Centrally across the base 10 there is a contact and mounting strip 116, upon the center portion of which there is mounted a vertically disposed rectifier unit 117 having an upper terminal 118 which is, of course, separate from the strip 116. Strip 116 is the positive (+) terminal of the rectifier, and strip 118 is the negative (—) terminal of the rectifier 117.

Figure 8:
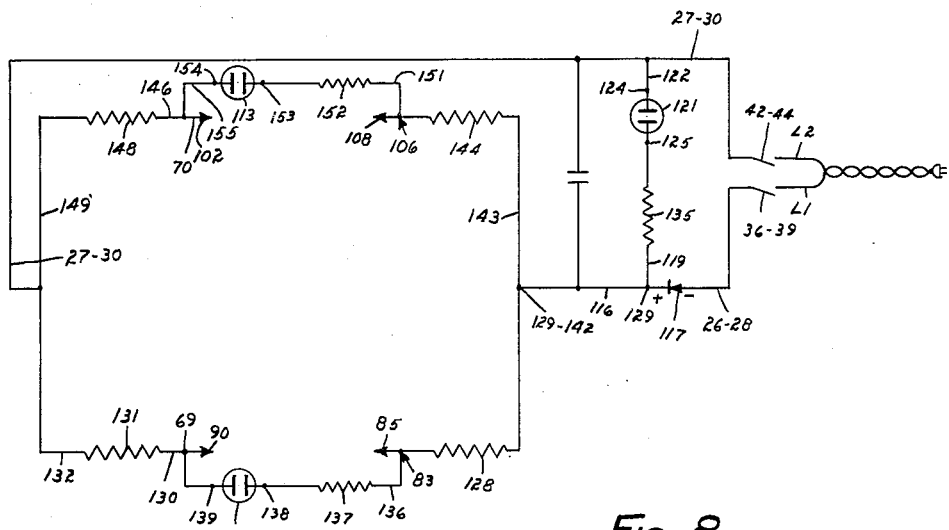
Figure 8 is a wiring diagram of the standard type of battery charging set for use on 110-volt alternating current circuits.

Referring to Figures 5, 6 and 8, the circuits through the rectifier may be traced as follows: The incoming power circuits $L_1$—$L_2$ have previously been traced through the switches 36—39, which controls line $L_1$, and 42—44 which controls $L_2$. Thus, when the switch 36—39 is closed, power from line $L_1$ is applied to the post 26 and hence to its terminal base 28 and likewise when the switch 42—44 is closed, power is applied from line $L_2$ to the post 27 and terminal portion 30. From these portions the circuit then continues. From the portion 28 of post 26 (line $L_1$) a circuit extends through conductor 120 to the negative terminal 118 of rectifier 117 and thence vertically downwardly through the rectifier to the positive rectifier treminal, which is the same as the contact strip 116 across the middle of the instrument. From the soldered junction 129 on the strip 116 a circuit extends through conductor 119, resistor 135, indicator light 121 and line 122 to the portion 30 and thence through post 27 and switch contacts 42—44 to line $L_2$. It may be noted that the lamp 121 is located centrally in respect to the front of the instrument. It is spaced along a line with lamps 113 and 97, previously mentioned, and the lamp 121 is likewise provided with a Lucite rod-button 134 which conveys the light from the lamp 121 out through a hole in the case to form an indication for the user. The light 121 is illuminated whenever the switches 36—39 and 42—44 are closed, whenever the case top 60 is moved downwardly, as previously described.

The lamp 121 is physically mounted upon the base 10 by means of its relatively stiff terminal conductors 123 and 124. These are soldered to tiny cup rivets that are inset at 125 and 126 through the base 10, and hence the cup rivets 125—126 serve as terminals to which the conductors are soldered and not only serve as electrical terminals, but as physical supports. Lamps 85 and 113 are similarly mounted.

From the junction 129 on strip 116 a circuit also extends via conductor 127 through resistor 128 to the contact and terminal arrangement 83. The contact and terminal strip 83, it will be remembered, serves as the B+ contact 85, against which the B battery is rested for charging purposes. If it is assumed that a B battery is in charging position (Figure 4) a circuit continues between the B+ terminal 85 and the rounded portion 90 of the strip 69, the electrical terminal of which is the pivot post 74 and from 74 a circuit extends via the conductor 130, to junction 133, thence through resistor 131 and conductor 132 to portion 30 of terminal 27 and via switch 42—44 to line $L_2$. From contact and terminal 83—85 a circuit extends through line 136, resistor 137 to mounting stud 138 and thence through indicator light 97, previously mentioned, to mounting stud 139 from which the circuit continues via line 140 through junction 133 and line 130 to the movable contact strip 69 previously mentioned. When a B battery is in place for charging, as shown in Figure 4 and Figure 2, the movable contact 69 engages the negative terminal of the B battery and the strip 85 engages the positive terminal of the B battery, thus placing the indicator lamp 97 and its resistor 137 in series across these terminals of the battery. The voltage drop across the battery B is insufficient to illuminate the lamp 97, and lack of illumination therefore indicates that the contacts of the charger have established proper charging connection with the battery B. If the lamp 97 is illuminated while a battery B is in place for charging this indicates that either contact 69 or strip 95 are not establishing proper contact and that the charging circuit is incomplete.

From mounting stud 142 on the contact strip 116 a circuit extends via line 143 through resistor 144 and line 145 to the contact and connection strip 106, the contact portion 108 of which serves as the A+ contact against which the A+ terminal of the A cell is placed during battery charging operation, as shown in Figure 3. If it is assumed that an A cell is in place, as shown in Figure 3, the circuit then continues to the A— terminal which is in contact with the portion 102 of the movable contact member 70 through which the circuit continues to its pivot 75 and thence through line 146 to junction 147 through a continuation of line 146 and thence through resistor 148 and line 149 to junction 150 and to the contact portion 30 of the post 27, thence through the post and through movable contacts 42—44 to line L₂. From the contact and terminal 106 a circuit extends over line 151 through resistor 152 to terminal and mounting stud 153, thence through glow lamp 113 to terminal and mounting stud 154 and through line 155 to junction 147 and thence through line 146 to movable contact 70—102. Accordingly, when an A cell is in recess 100 for charging operation, as shown in Figures 2 and 3, a potential is established across the A cell between movable contacts 70—102 and stationary contact 108. The potential across the A cell is not sufficient to illuminate the glow lamp 113 and hence lack of illumination of lamp 113 through the Lucite rod-button 115 shows that proper charging connection has been established. If lamp 113 is illuminated while an A cell is in place for charging, this will indicate that either the contact 70—102 or contact 108 is not establishing proper charging connection with the cell.

From terminal 142 on the contact strip 116, which is the positive terminal of the rectifier 117, a circuit extends over line 153 to condenser 160 and thence over line 161 to junction 159 to contact portion 30 of the post 27 and through switch contacts 42—44 to line L₂. The condenser 160 can, optionally, be omitted where smoothness of power output is of no importance.

The circuits traced have been identically numbered, Figures 5 and 8. Figure 8 operates very satisfactorily for relatively low voltage alternating current circuits, such as 110-volt 50–60 cycle circuits. It will be noted that when no battery is in place in the B battery charging depression 87, the movable contact blade 69 moves in the direction of arrow 95 and engages the upturned portion 84' of the contact 83, thus short-circuiting the circuit of indicator lamp 97. A circuit, however, is maintained at this time through the B battery charging network beginning at terminal 129—142 through resistor 128, through movable contact 85 to contact portion 90 and connection 130, resistor 131 to the contact portion 30 of the post 27. Charging current is maintained through this circuit so that approximately the same total charging current will flow through the rectifier, as determined by the resistances 128 and 131. Similarly, when an A cell is not in recess 100 for charging, the movable contact 70 engages the contact 107' and establishes a circuit which likewise flows from terminal 118—142 through resistor 144, contact 108, contact 102, movable contact 70, resistor 143, line 149 to terminal 30 on post 27. The load through the rectifier is, therefore, never reduced below the amount of current flowing through resistors 128 and 131 in series and this serves to protect the rectifier against deterioration due to total open circuiting conditions.

Figure 9:
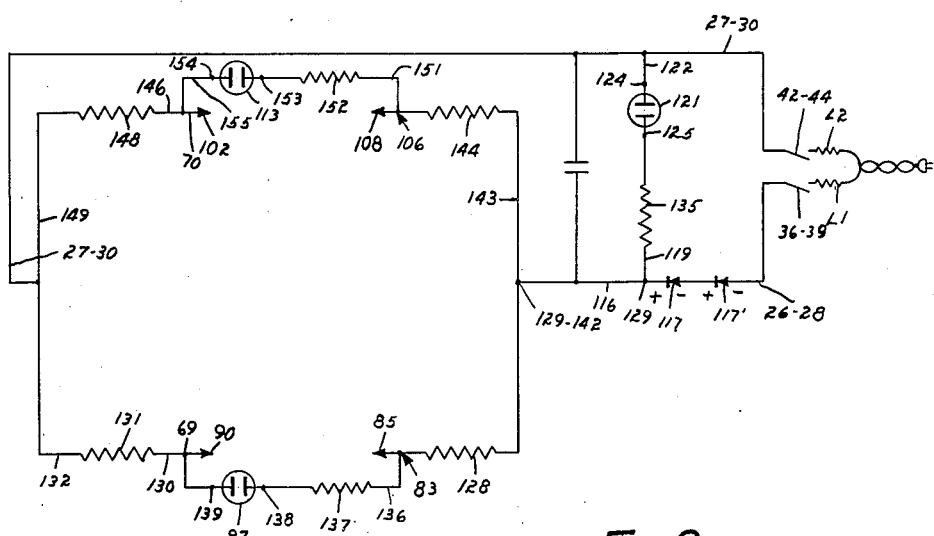
Figure 9 is a wiring device of a slightly modified form suitable for use on higher voltage circuits, such as 220-volt alternating current circuits.

For use on higher voltage alternating current circuits the apparatus is slightly modified as shown in the wiring diagram Figure 9, which is identical with that shown in Figure 8 and therefore need not be described, except for the following particulars: In place of a single rectifier cell 117 there is added in addition in series a second rectifier cell 117' and the flexible cord constituting lines L₂ and L₁ is made of a resistance material providing approximately 1000–1500 ohms resistance in the cord itself. The resistance in the cord L₁ and L₂ of Figure 9 and the additional rectifier cell 117, enables the use of the circuits on higher voltages such as 220-volt 50 or 60 cycle circuits.

As many apparently widely different embodiments of this invention may be made without departing from the spirit and scope thereof, it is to be understood that we do not limit ourselves to the specific embodiments herein.

What we claim is:

1. In a battery charging device having a source of unidirectional current, a case having a recess for receiving the unit to be charged, said recess having terminals, means therein for contacting the terminals of the unit for charging, a swinging cover mounted on said case so as to cover said recess and to be movable to a position to expose said recess, means for completely de-energizing the terminals when the cover is swung to expose the recess and to energize the terminals when the cover is swung to cover said recess.

2. The battery charger device of claim 1 further characterized in that said terminal means includes one mounted for movement to a position engaging the other terminal so as to complete an electrical circuit therethrough when no unit is in the recess.

3. The battery charger device of claim 1 further characterized in that glow lamp means is mounted in the case and is connected across said terminal means so as to be energized and the glow lamp means illuminated when a unit is in the recess being charged, said case being apertured so the glow lamp means when illuminated is visible from the exterior of the case.

4. A battery charger device having alternating current supply line and a rectifier, a case, said case being shaped to receive a unit to be charged and provided with terminals, connected to said rectifier and alternating current supply for charging positioned against the case, a cover hinged to the case and shaped to cover a unit during charging when the cover is swung against the case and switch means on the case actuated by said hinged cover and connected in circuit with said alternating current supply line for de-energizing the charger device when said cover is swung away from the case.

5. The battery charger of claim 4 further characterized in that said cover is transparent.

6. A battery charger device comprising a case having a recess therein shaped to receive a unidirectional voltage unit to be charged, said recess having a first terminal at one end thereof, a second terminal mounted in said case for movement toward and away from said first terminal, said second terminal extending through the case wall forming said recess and being biased to move into engagement with said first terminal when no unit is in the recess.

7. The battery charger of claim 6 further characterized in that said second terminal is pivotally mounted within the case and constitutes a blade extending through a slot in the case wall.

8. In a battery charger, a flat base, a pair of stiff conductors extending upwardly from the base, spring contact means mounted on each post, presser bar means mounted so as to be movable vertically to push said spring contact means to close circuits therethrough to said posts, a case connected to and covering said base, said presser bar means being slidable through a slot in said case, a swinging cover mounted on the case for swinging movement from a position away from said case to a position covering a portion of said case, said cover having a part thereon engageable with said presser bar to close the switch means when the cover is swung to a position covering a portion of said case.

9. The battery charger of claim 8 further characterized in that the portion of the case covered by said swinging cover has a longitudinal recess therein for receiving a unit to be charged when laid in said recess, said recess being provided with a fixed contact against which a unit may rest and with which one terminal of the unit contacts for charging, and a blade mounted within the case and projecting through a slot extending lengthwise of the recess for contacting another terminal of said unit, said blade being spring biased towards said fixed contact.

10. The battery charger of claim 9 further characterized in that the portion of the case covered by the swinging cover has two longitudinal recesses in one of which A cells may be placed for charging and in the other of which B batteries may be placed for charging, each recess provided with fixed and swinging blade terminals.

11. A battery charger comprising a pair of alternating current supply lines each equipped with a switch for opening and closing the same, a rectifier connected to one of the alternating current lines for rectifying the current flowing therethrough, parallel charging circuits each connected between said rectifier and the other alternating current supply line, each parallel charging circuit including a resistor, a first terminal for contacting a unit to be charged, a second terminal biased towards the first for contacting a unit to be charged and another resistor.

12. The apparatus of claim 11 further characterized in that each of the parallel charging circuits includes an indicator glow lamp connected across the first and second terminals.

RUSSELL C. GILBERT.
LESTER L. WILBRECHT.

REFERENCES CITED

The following references are of record in the file of this patent:

UNITED STATES PATENTS

| Number | Name | Date |
| --- | --- | --- |
| 1,004,101 | Stone | Sept. 26, 1911 |
| 1,425,689 | Powell | Aug. 15, 1922 |
| 2,000,571 | Oswald | May 7, 1935 |
| 2,036,547 | Siemon | Apr. 7, 1937 |
| 2,082,168 | McKinley | June 1, 1937 |
| 2,199,322 | Skinner | Apr. 30, 1940 |
| 2,375,866 | Nelms et al. | May 15, 1945 |
| 2,410,527 | Schinske | Nov. 5, 1946 |
| 2,451,726 | Fry | Oct. 19, 1948 |
| 2,483,673 | Robinson et al. | Oct. 4, 1949 |
| 2,491,031 | Burgess | Dec. 13, 1949 |